United States Patent [19]

Fletcher et al.

[11] 3,813,937

[45] June 4, 1974

[54] HEAT FLOW CALORIMETER

[76] Inventors: James C. Fletcher; William V. Johnston, both of 20300 Fredrick Rd. No. 25, Germantown, Md.

[22] Filed: June 16, 1972

[21] Appl. No.: 263,498

[52] U.S. Cl............................................. 73/190 R
[51] Int. Cl. .......................................... G01k 17/00
[58] Field of Search .................. 73/15 R, 15 B, 190

[56] References Cited
UNITED STATES PATENTS

| | | | |
|---|---|---|---|
| 2,800,793 | 7/1957 | Oliver | 73/190 |
| 3,059,471 | 10/1962 | Calvet | 73/190 |
| 3,267,728 | 8/1966 | Solomons | 73/190 |
| 3,667,294 | 6/1972 | Schoenlaub | 73/190 |
| 3,675,465 | 7/1972 | Sommer et al | 73/15 |

OTHER PUBLICATIONS

Andersen, "Polymerization Rates by Calorimetry," in Journal of Polymer Science, A-1, Vol. 7, 1969, pg. 2,889–2,896.

"Simple Method of Thermal Analysis Permitting Smith Quantatative Measurements of Specific and Latent Heats," of Mining and Metallurgical Engineers in Transactions of The American Institute, Vol. 137, 1940, pg. 236–239.

*Primary Examiner*—Herbert Goldstein
*Attorney, Agent, or Firm*—Robert F. Kempf; John R. Manning

[57] ABSTRACT

This invention generally relates to heat flow calorimeter devices for measuring heat liberated from or absorbed by an object and particularly concerns a calorimeter device capable of measuring the thermal output of sealed nickel-cadmium batteries or cells during charge-discharge cycles thereof. In the preferred embodiment, the invention contemplates the provision of a thermally isolated calorimeter vessel into which an object, such as a nickel-cadmium cell, is placed, heat exchange taking place between the object and the vessel. An elongated metal heat conducting rod is coupled between the calorimeter vessel and a heat sink, thus providing the only heat exchange path from the calorimeter vessel itself. Heater wires disposed within the calorimeter vessel supply additional heat to the vessel to maintain a constant temperature head therein or, more specifically, to maintain a constant temperature differential between the vessel and the heat sink. Any variation in the amount of heat supplied to the vessel and specifically any variation in power supplied the calorimeter vessel heater besides that necessary to maintain the constant temperature difference between the vessel and the heat sink is equal to the amount of heat liberated or absorbed by the object within the vessel itself, and means are provided for measuring this heater power. The apparatus is constructed into electrically insulated split halves so that the heat conducting rod and other components of the system are themselves utilized to conduct power to and from nickel-cadmium cell disposed within the calorimeter vessel.

10 Claims, 5 Drawing Figures

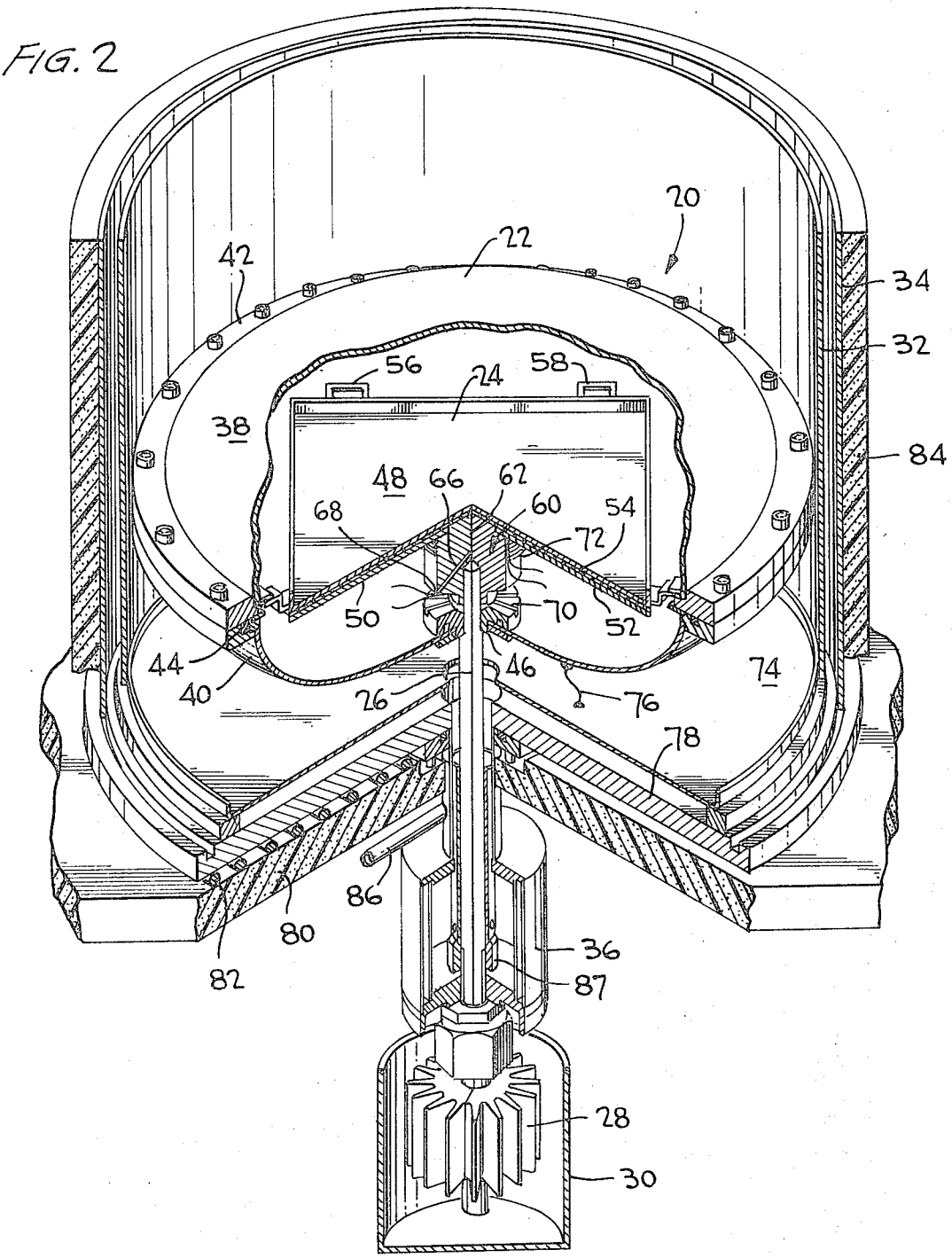

HEAT FLOW CALORIMETER

ORIGIN OF THE INVENTION

The invention described herein was made in the performance of work under a NASA contract and is subject to the provisions of Section 305 of the National Aeronautics and Space Act of 1958, Public Law 85-568(72STAT.435; 42 U.S.C. 2457).

BACKGROUND OF THE INVENTION

This invention generally relates to heat flow calorimeter devices for measuring heat liberated or absorbed by an object and particularly concerns a calorimeter device capable of measuring the thermal output of sealed nickel-cadmium batteries or cells during charge-discharge cycles thereof.

It is oftentimes necessary to acquire a knowledge of heat generated and/or absorbed by various objects during operation thereof, such as by different types of nickel-cadmium batteries during charge-discharge cycles. With such batteries or cells, for example, the mechanisms of the reactions occurring therein during charge and discharge are not well defined and theoretical predictions of heat effects thereby resulting are not possible to make. Thus, heat effects of objects of this type must be determined experimentally. The nature of the calorimetry required to obtain such information is somewhat unusual in the art in that it is necessary to measure the heats over a succession of charge-discharge cycles of the cells, and such heat generation is expected to be relatively large. Accordingly, conventional prior art calorimetric techniques, adiabatic or isoperibolic, cannot readily be applied.

Therefore, a need exists for the development of a calorimeter which is specifically suited for measuring the thermal output of sealed nickel-cadmium cells, as well as for measuring the thermal output of other more generalized objects.

SUMMARY OF THE INVENTION

It is a primary objective of the instant invention to provide a calorimeter which will fill the above-mentioned existing need, and, specifically, a calorimeter which is capable of measuring the thermal output of sealed nickel-cadmium cells having a relatively high ampere-hour capacity.

A further objective of the instant invention is the provision of a calorimeter which can measure the thermal output of a nickel-cadmium cell, or any other generalized object, with a high degree of sensitivity, such calorimeter being versatile in its use, having a design facilitating construction, and reducing the cost thereof.

Yet another objective of the instant invention is the provision of a conduction heat flow calorimeter which operates in a much improved fashion as compared with all prior art calorimeters of similar type.

These objectives, as well as others which will become apparent as the description proceeds, are implemented by the instant inventive heat flow calorimeter which, as aforementioned, is capable of measuring heat liberated or absorbed by virtually any object with a high degree of accuracy. In its broad sense, the calorimeter of the instant invention will be seen to comprise a thermally isolated vessel which is adapted to receive the object from which heat liberation or absorption is to be measured, heat exchange between the object and the vessel thereby being effected. A heat sink, preferably maintained at a constant temperature, considerably lower than that of the vessel itself, is coupled to the vessel by means of a metal rod which defines the only heat exchange path from the vessel, the rate of heat loss into the heat sink thereby being known. The instant invention contemplates the provision of a means, such as an electrical heater wire within the calorimeter vessel, for supplying additional heat to the vessel so as to maintain a constant temperature head therein. Explained in other words, the means for supplying additional heat to the vessel serves to maintain, in an automatic fashion, a constant temperature differential between the vessel and the heat sink.

As should be appreciated, thermal effects taking place in the calorimeter due to heat liberated or absorbed by an object therein requires an automatic adjustment in the amount of additional heat supplied to the vessel so as to maintain the constant temperature head. The instant invention, therefore, contemplates the provision of means to measure the amount of additional heat supplied to the vessel as an indication of the amount of heat liberated or absorbed by the object within the calorimeter. As will be appreciated from the description hereinbelow, the amount of additional heat supplied to the vessel necessary to maintain the constant temperature head is indeed equal to the heat liberated or absorbed in the calorimeter itself.

The method or theory by which such technique is effective to measure heat liberated or absorbed by an object can perhaps best be understood by an initial reference to FIG. 1 of the appended drawings, wherein the method of the instant invention is schematically depicted.

In this respect, it should be appreciated that the equation for steady state heat flow ($W_T$) in a rod of constant cross-sectional area between two bodies, A and B, one acting as a heat source at $T_2$ such as the calorimeter vessel and the other as a heat sink at $T_1$, and with no heat exchange along $\Delta X$ to the surroundings (heat exchange limited to be within the rod), can be expressed as:

$$W_T = k\, A\, (T_2 - T_1/\Delta X)$$

where A is the cross-sectional area of the rod connecting the source and sink normal to the direction of heat flow, and $k$ is the mean thermal conductivity between $T_2$ and $T_1$, and $\Delta X$ is the distance between the heat source and the heat sink. At any location along the rod connecting the source and sink, the law of heat exchange (heat in = heat out) governs and may be applied in the heat flow calorimeter of the instant invention in the following manner: Let A be the calorimeter vessel, surrounded by an adiabatic jacket so that no heat is exchanged with the surroundings except through the solid rod conductor, and let $W_A$ be the amount of heat which must be supplied to the vessel to maintain the temperature $T_2$. The heat sink ($T_1$) might be a liquid at its boiling point where its heat vaporization serves to hold temperature constant.

$$\text{At steady state } W_A = W_T$$

The total input heat power ($W_A$) to the vessel can be considered to be made up of a number of components, $W_E$, $W_B$, $W_L$, and $W_C$, all of which may not be applicable at one time, where:

$W_E$ = heat added electrically to the vessel to maintain $T_2$ constant $W_B$ = heat evolved (or absorbed) by the cell or object within the vessel being studied.

$W_L$ = heat input or loss from the calorimeter due to heat leakage with the surroundings $W_C$ = heat introduced to the vessel by a calibration heater, as will be explained hereinbelow.

Since $W_A$ is a constant as long as the constant thermal head is maintained at the vessel, heat evolved or absorbed by the object within the vessel is compensated by changes in the electrical input ($W_E$) to the vessel heater. It is not necessary that $W_L$ be known as long as it is constant.

BRIEF DESCRIPTION OF THE DRAWINGS

With the above theory now firmly in mind, the invention itself will be better understood and further advantageous features thereof will become apparent from the following detailed description of a preferred inventive embodiment, such description making reference to the appended sheets of drawings, wherein:

FIG. 1 is a schematic illustration of the operational technique of the instant invention, as has already been described;

FIG. 2 is a perspective illustration, partially broken away for illustrative clarity, of the heat flow calorimeter of the instant invention;

DETAILED DESCRIPTION OF A PREFERRED INVENTIVE EMBODIMENT

Figure 3:
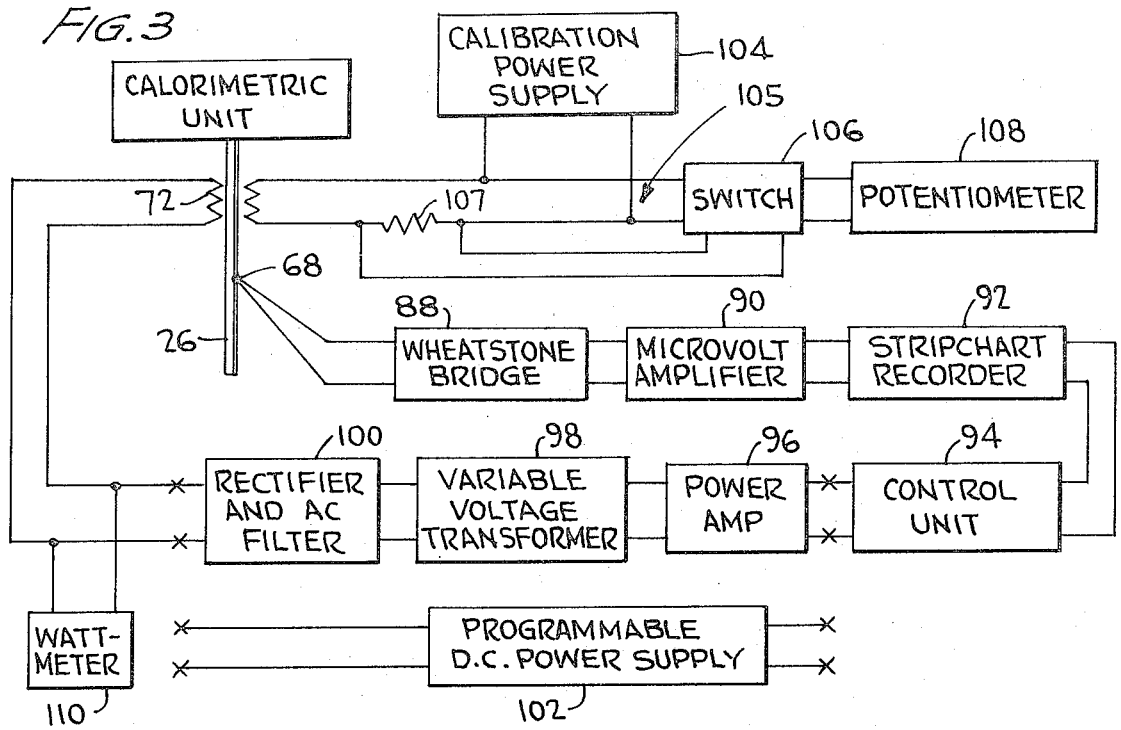
FIG. 3 is an electrical schematic diagram of the measuring circuitry utilized to detect the amount of additional heat applied to the calorimeter vessel to maintain the constant temperature head.

Referring now to the drawings, and particularly to FIG. 2 thereof, the novel heat flow calorimeter of the instant invention is depicted and will be seen to comprise three basic units or portions. Specifically, the first portion comprising the calorimetric unit per se generally designated by reference numeral 20 includes pressurized shell 22, the interior of which houses a support structure 24 adapted to hold an object from which the heat liberation or absorption is desired to be measured. A metal rod 26, constructed of a material such as copper, for example, is coupled to the cell support structure 24 and serves to conduct heat therefrom to a finned surface 28 immersed in a boiling liquid, such as nitrogen, for example, the boiling liquid defining a heat sink generally designated by reference numeral 30.

The second portion of the calorimeter is an upper portion thereof and, in its broad sense, will be seen to comprise an adiabatic shield 32 in the form of a cylinder surrounding the pressure shell 22, a bottom shield section 74 and a non-illustrated top shield section, as well as a cylindrical vacuum jacket 34 which surrounds the adiabatic shield 32.

The third portion of the inventive calorimeter is a lower portion, and will be seen to comprise a vacuum unit designated by reference numeral 36 which surrounds the metal rod 26 and minimizes heat exchange therefrom to the surrounding environment.

The pressure shell 22 of the calorimeter unit comprises the calorimeter vessel into which an object is placed, the pressure shell preferably being in the form of an oblate spheroid formed from two dishes 38 and 40 joined at the equator thereof by a flange 42 containing a seal 44. The pressure shell 22 is, of course, designed to operate under pressure, such as a five atmosphere pressure differential. The lower half shell 40 is provided with an orifice 46 therein so as to allow exit of the heat conducting rod 26 as well as various electrical leads as will be discussed in more detail hereinbelow.

Inside the pressure shell 22 is an object or cell holder 24 as above-discussed, this holder comprising a tray 48 and underlying electrodes 50 and 52 separate from the tray 48 by a sheet of insulating material 54, such as Mylar or polyester material. The electrodes 50 and 52 terminate at terminals 56 and 58, respectively, these terminals being insulated from the tray 48.

A silver casting generally designated by reference numeral 60 is preferably soldered to each of the two underlying electrodes 50 and 52 and also to the metallic rod 26, this rod, as above-discussed, serving to conduct heat from the tray 48 to the heat sink 30. Specifically, this cylinder 60 serves as a funnel for heat flow from the tray 48 to the metal rod 26. This cylinder is split, and each half of the cylinder is electrically isolated from the other by means of an insulating film 62. Further, it should be noted that the heat conducting rod 26 is likewise split into two halves, each half being electrically insulated from the other by an insulating film, each half of the rod 26 being connected to a different half of the silver cylinder 60. Finned element 28 is likewise split with each half insulated from the other by an insulating film.

This "split" construction of the above-described components is an important and advantageous feature of the instant invention, particularly when considering the specific utilization of the heat flow calorimeter for measuring heat generated by nickel-cadmium cells during charging and discharging cycling thereof. For example, it should be noted that electrical conducting paths exist from each half of the heat conducting rod 26, through each half of the silver cylinder 60, to the underlying electrodes 50 and 52 coupled to the respective terminals 56 and 58. Electrical conductors 64 are coupled to each half of the heat conducting rod 26 and, in this fashion, current can be carried through the various components to the terminals 56 and 58 for subsequent connection to the nickel-cadmium cell, one terminal 56 functioning as a positive terminal, for example, the other terminal 58 functioning as the negative terminal, with each different half of the various split sections functioning as a respective positive or negative current conducting half.

A bore 66 is provided into one portion of a silver cylinder 60 and, in this bore, a thermistor 68 is placed, the electrical leads from the thermistor being brought out of the pressure shell 22 through an electrical pass-through 70 associated with aperture 46 as will be discussed hereinbelow. Additionally, two separate loops of heater wire are non-inductively wound about the heat flow concentrator or cylinder 60, these two separate heater wires being generally designated by the single reference numeral 72, the wires connecting these heaters also being taken from the pressure shell 22 through the electrical pass-through 70.

The electrical pass-through 70 disposed at the bottom of the lower half 40 of the pressure vessel 22 is preferably constructed of an insulating material such as nylon or aluminum with insulating inserts, and allows electrical leads to be taken out of the pressure shell 22 and further allows the metal heat conducting rod 26 to pass therefrom in a manner whereby the hermetic seal of the pressure shell 22 is maintained. The metal heat conducting rod 26 thereafter passes through a lower vacuum unit 36 as described which prevents heat loss from the rod to the surrounding atmosphere, the rod terminating in the heat dissipating fins 28 disposed in a liquid pool or bath defining a heat sink 30 also as described.

The calorimeter unit is, as aforementioned, surrounded by an adiabatic shield 32 which is preferably constructed in the form of a cylinder having cylindrical side walls as shown, a bottom shield section 74, and a non-illustrated top shield section. A difference thermocouple, such as thermocouple 76, is disposed between the lower half 40 of the pressure shell 22, and the bottom adiabatic shield 74. Further difference thermocouples, which have not been illustrated so as to preserve clarity, are disposed between the side walls of the shield and the shell 22, as well as between the non-illustrated top portion thereof of the shield and the shell 22. The purpose of such thermocouples will become clear from subsequent descriptions of operation, yet, it should be appreciated at this time that a zero difference in temperature is desired to be maintained between the pressure shell 22 and the bottom adiabatic shield 74, and a zero temperature differential is likewise desired to be maintained between other surfaces of the shield and the different surface portions of the shell 22. In this fashion, with the adiabatic shield 32 maintained at the same temperature as in the pressure shell 22, heat loss from the pressure shell into the surrounding environment is prevented, the only path of heat flow from the pressure shell 22 being through the heat conducting rod 26 towards the heat sink 30. Any temperature differential sensed by the thermocouple 76 as well as the other thermocouples serve to actuate adiabatic shield heaters, as will be explained, so that such temperature differences can be corrected.

The adiabatic shield 32 is supported upon a base plate generally designated by reference numeral 78 which base plate, in turn, rests upon a plastic foam insulation 80 further insulating the upper portion of the calorimeter from the considerably lower temperatures defined by the heat sink 30.

As previously explained, the adiabatic shield 32 is itself surrounded by a vacuum jacket 34, this jacket likewise being cylindrical in construction and similarly having a non-illustrated top walled portion so as to define a hermetically sealed chamber. Cooling coils 82 may be provided, if desired, on the top, side, as well as bottom portions of the apparatus so as to provide a means for cooling the vacuum jacket and chamber, if desired. The exterior of the vacuum jacket 34 is itself insulated with a foam, such as designated by reference numeral 84.

The lower vacuum unit 36 comprises, as is illustrated, a double-walled cylinder in the preferred inventive embodiment, and a brass cylinder 87, concentric with heat conducting rod 26, threaded into the bottom of lower vacuum unit 36. This arrangement serves to provide a vacuum and thermal radiation shield about the heat conducting rod 26 thus further reducing heat loss therefrom to the surrounding environment.

The vacuum maintained within the vacuum jacket 34, as well as within the lower vacuum unit 36, can be effected by a vacuum line or pump schematically depicted and designated by reference numeral 86.

Reference is now made to FIG. 3 of the appended drawings wherein some of the electrical circuitry utilized to maintain a constant temperature head within the pressure shell 22 will be explained. As described at the outset to this specification, heat input (or absorption) into the calorimeter unit, and specifically into the cell support structure 24, effectively comprises that generated from the object placed upon the tray 48, as well as that generated by one of the additional heater windings 72 disposed about the heat flow concentrator or cylinder 60. Since the rate of heat loss from the pressure shell 22 is known, with no heat loss except that along the heat conducting rod 26 to the heat sink 30, thermal effects caused by heat generation from the object within the calorimeter vessel or pressure shell 22 is compensated for by adjustments in the amount of power provided the heater winding 72. Measurement of the change in amount of power provided the heater winding while maintaining the temperature head within the calorimeter vessel constant is indicative of, and in fact equal to, the heat generated or absorbed by the object within the vessel itself.

The circuitry depicted in FIG. 3 of the appended drawings achieves this automatic adjustment of the power into heater winding 72, and further effects the measurement of such power as an indication of heat generation by the object. In this respect, the thermistor disposed within the heat flow concentrator 60 of the calorimeter vessel again is designated by reference numeral 68 and is schematically depicted as being coupled to the heat conducting rod 26. Thermistor 68 comprises one arm of a wheatstone bridge 88 and changes in the resistance value of thermistor 68 due to changes in the thermal head of the calorimeter vessel effects an unbalance of this bridge. This unbalance is amplified by amplifier means 90 and such unbalance may be visually represented on a strip chart recorder 92, for example. The unbalanced electrical characteristics of bridge 88 then passes through a control unit 94 and into a power amplifier 96 from where the voltage is transformed in variable voltage transformer 98, rectified and filtered by rectifier and filter means 100 and the resultant DC voltage is then applied to the main heater 72 surrounding the silver cylinder or heat flow concentrator 60. The system thus comprises a closed-loop servo system or feedback arrangement by which temperature variations sensed by thermistor 68 are converted into a corrective voltage applied to the heater 72 which serves to maintain a constant temperature head of a value determined by control unit 94, for example. A programmable DC power supply generally designated by reference numeral 102 may alternatively be used in place of elements 96, 98, and 100, to power the system in a conventional fashion. Of course, it should be appreciated by those skilled in the art that various other electrical embodiments of an automatic heater control could be utilized if so desired, the important concept herein being that temperature variations within the calorimeter must be sensed and corrected by a heater means so as to maintain the temperature head constant.

If desired, a calibration heater wire which comprises the second heater 72 described as being wound about the heat flow concentrator 60 could be provided. This calibration heater may be similar in construction to the wire wound main calorimeter vessel heater above-described, and is supplied with power from the conventional power supply 104, the amount of power to the calibration heater 72 is measured through the use of resistor 107 in line 105 and the operation of a switch means 106 coupled to a potentiometer 108, thereby allowing the potentials across line 105 and resistor 107 to be independently measured by potentiometer 108. The power supply 104 to the calibration heater is itself calibrated and thus may provide a base or reference for operation of the main heater control servo-loop circuitry in conventional fashion.

The amount of power applied to the main calorimeter vessel heater 72 as above-discussed is equal to the heat liberated or absorbed by an object within the vessel itself plus the steady state flow ($W_T$) between the vessel 22 and heat sink 30. Therefore, the instant invention provides a means by which this heater power, or specifically the change in heater power required to maintain the temperature head, can be measured. In the preferred inventive embodiment, a high accuracy, precision watt meter generally designated by reference numeral 110 serves to measure the electrical power supply to the calorimeter heater 72, the watt meter 110 operating in accordance with the Ohms Law relationship of: Watts = $E^2/R$, wherein E is the voltage drop across the resistance R of the calorimeter heater or heater means 72. This particular design of the watt meter has an advantage wherein only voltage need be measured presuming that the heater resistance remains constant over various ranges of input power supplied thereto. In this respect, the heater 72 could be constructed of a material such as Evanohm, a special alloy developed for high precision resistors.

Figure 5:
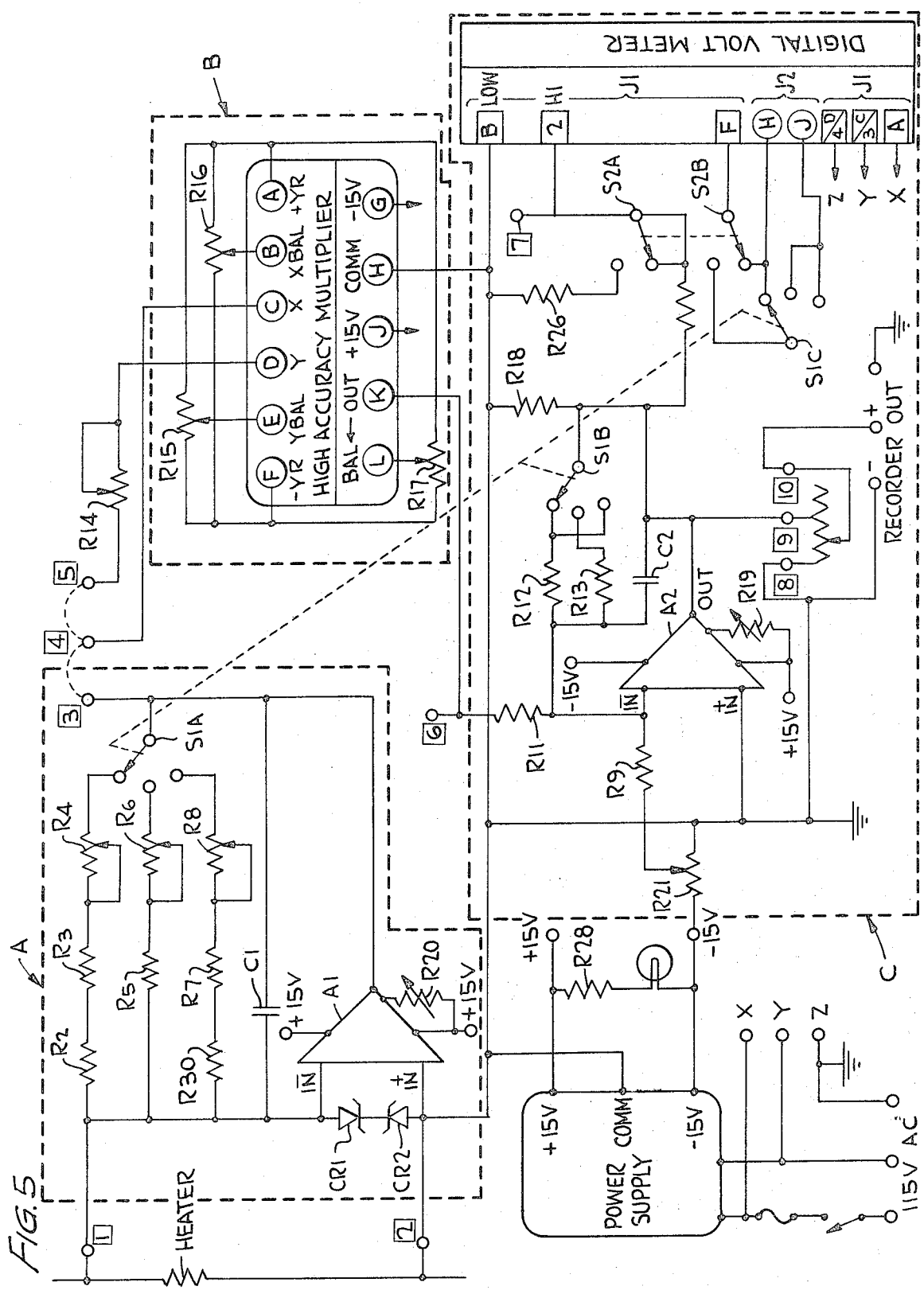
FIG. 5 is a detailed electrical schematic depicting the circuitry of the watt meter utilized in the system diagram of FIG. 3 to measure calorimeter heater power.

While it should be appreciated that virtually any watt meter or similar power measuring device could be utilized with the system of the instant invention, the preferred watt meter construction is electrically schematically illustrated in FIG. 5 of the appended drawings. In this respect, the preferred watt meter comprises a ranging section designated by the dotted line block with reference letter A which conditions an input voltage applied thereto to zero to 10 volts for full scale ranges of 5, 25, and 50 watts, for example. The preferred watt meter further comprises an electronic multiplier section depicted by the dotted line block designated by reference letter B, this multiplier section serving to square the voltage. Finally, the preferred watt meter incorporates a signal conditioning section designated by the dotted line block with reference letter C, which adjusts the output voltage so as to interface same with a strip chart recorded and a digital volt meter, this section further providing a base line offset. The electronic multiplier section is itself a prior art device such as that designated Analog Devices Model 424K. The digital volt meter disposed within the signal conditioning section C likewise comprises a prior art device, such as a three-digit bipolar digital volt meter as manufactured by Digilin Inc., Model 332.

The preferred wattmeter has three ranges, 5, 25, and 50 watts, corresponding to inputs of 22.36, 50.0, and 70.7 volts, respectively. The ranging section "A," through the use of negative feedback around the operational amplifier $A_1$ and the resistances $R_2$ through $R_8$ and $R_{30}$ reduces these voltages to 10 volts. This may be measured at test point ③. This voltage is applied to both the X and Y inputs of the high accuracy multiplier to accomplish the squaring. The multiplier performs the function $$XY/10 = Z$$

so that 10 volts output is obtained for 10 volts input to both X and Y. This voltage is measured at ⑥.

The output section contains the operational amplifier $A_2$ which operates at unity gain using negative feedback for stability and switches and resistors which provide decimal switching and a 0–1 volt signal for the digital voltmeter. A 10 position 1, 2, 4, 8 attenuator is connected to ⑧, ⑨, ⑩ to provide full range outputs between 9.76 millivolts and 10 volts and, when used with the offset voltage potentiometer (R21), serves to expand a smaller portion of the range for increased resolution when used with a recorder. A description of such a use is contained in the following example. When operating in the 50 watt range with 50 watts equal to full scale on the recorder, the resolution per division is 0.5 watt. If it is desired to increase resolution to say 0.0625 watts per division, the gain can be increased by a factor of 4 by moving the attentuator to three positions less attentuation and using the offset potentiometer to keep the signal on scale. Full span of the recorder is now approximately ¼ of 50 or 12.5 watts. This is accomplished without any change to the inputs to the multiplier. The output signal from the wattmeter always contains a resolution of at least 0.05 watts and can be read to this resolution by a four digit voltmeter without altering the attenuator. This is possible because of the stability and linearity of the multiplier unit.

A three-digit bipolar digital voltmeter such as Digilin Inc. Model 332 is incorporated into the wattmeter to provide a visual indication of the wattmeter output. The voltmeter reads directly in watts with a resolution of 0.01 watt when the wattmeter is operating in the 5 watt range and a resolution of 0.1 watt when the wattmeter is operating in the 25 and 50 watt range. A 10X output multiplier range is incorporated which increases the resolution to 0.01 watt on the 25 and 50 watt if the offset potentiometer is adjusted to buck out all but 5 watts equivalent output voltage. This expansion is independent of the attenuator setting but affects the position of the pen on an analog recorder.

Figure 4:
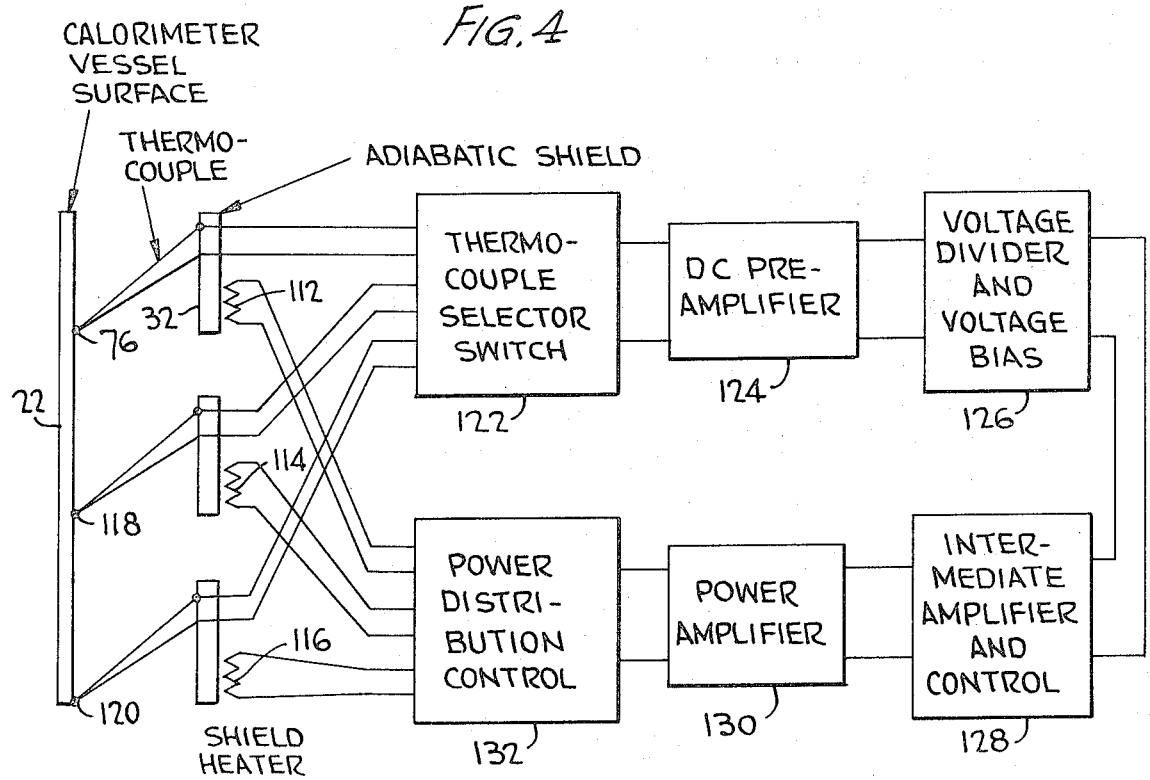
FIG. 4 is an electrical schematic block diagram of circuitry utilized in conjunction with an adiabatic shield surrounding the calorimeter of the instant invention to maintain such shield at a constant temperature and thereby minimize heat loss to the surrounding environment from the calorimeter vessel.

As explained at the outset, the adiabatic shield 32 surrounding the calorimeter vessel is itself maintained at a constant temperature and preferably at a zero temperature differential as compared with the pressure shell 22. The electrical control means by which this operation is effected can be appreciated from a review of FIG. 4 of the appended drawings.

In this repect, a plurality of heater means, such as heater means 112, 114 and 116, are disposed at various surface portions of the adiabatic shield 32, such as the bottom, the top, and the sides. Difference thermocouples such as thermocouple 76, 118, and 120 are coupled to the various surface portions 32 of the adiabatic shield to which the heaters are associated therewith, thermocouple 76, 118 and 120 further being coupled between such surface portions and pressure shell 22 of the calorimeter vessel.

The signal from either of the three thermocouples 76, 118, and 120 located, for example, between the top, side, and bottom of the adiabatic shield 32 and the calorimeter vessel 22 is selected by a switch means, such as a rotary switch 122 and is fed to an amplifier 124. The output from amplifier 124 is reduced by a voltage divider 126 which functions as a sensitivity control, this signal then being inputted into an intermediate amplifier 128 having a proportional band, reset and approach control format. The output from intermediate amplifier 128 is then used to drive a power amplifier 130, the output from power amplifier 130 being fed through a power distribution control means 132 which selectively controls the power applied to the adiabatic shield heaters 112–116. In this fashion, individual adjustment of the power to the heaters 112 – 116 disposed on the outside surfaces of the adiabatic shield sections can be achieved. The servo-loop above-described serves to automatically maintain one surface of the adiabatic shield 32 at a zero temperature differential as compared with the calorimeter vessel and the power distribution control means 132 which incorporates autotransformer arrangements as is conventional serves to control the other adiabatic shield surfaces and trim such surfaces to a similar zero differential.

With the above-described construction, and specifically when utilizing the calorimeter apparatus of the instant invention to measure heat generation of nickel-cadmium cells, it has been found that thermal output of such cells can be measured with a very high degree of accuracy over a wide temperature range, with the response time of the apparatus to a change of thermal output being relatively short and stable, and with the calorimeter apparatus permitting current flow through the "split" sections thereof of at least 50 amperes to the nickel-cadmium cells being measured without adversely affecting the heat measurement taking place. It should therefore be apparent from the foregoing detailed description that all the objectives set forth at the outset of this specification have been successfully achieved. Moreover, while there has been shown and described present preferred embodiments of the invention, it is to be distinctly understood by those skilled in the art that the invention is not limited thereto, but may otherwise be variously embodied and practiced within the scope of the following claims. Accordingly,

What is claimed is:

1. A heat flow calorimeter for measuring heat liberated from or absorbed by an object during a reaction period, said calorimeter comprising:
   a calorimeter vessel adapted to receive the object;
   a constant temperature heat sink;
   thermal conductor means coupled between said vessel and said heat sink for effecting heat exchange therebetween;
   controllable heater means for supplying heat to said vessel;
   adiabatic shield means disposed about said vessel of said calorimeter but not said heat sink, said shield means thermally isolating said vessel from its surrounding environment so that the only heat exchange path between said vessel and said heat sink is defined by said thermal conductor means;
   means for controlling said heater during the reaction period such that said vessel is maintained at a substantially constant temperature higher than the temperature of said heat sink and such that the rate of heat flow effected by said thermal conductor means from said vessel to said sink is maintained constant; and
   means for measuring the amount of heat supplied said vessel by said heater means; whereby changes in the amount of heat supplied said vessel by said heater means while maintaining a constant temperature of said vessel are indicative of thermal effects within said vessel and are equal to the amount of heat liberated or absorbed by the object.

2. A heat flow calorimeter as defined in claim 1, including means to maintain said shield at a substantially constant temperature.

3. A heat flow calorimeter as defined in claim 1, wherein said thermal conductor means comprises an elongated metal rod.

4. A heat flow calorimeter as defined in claim 3, wherein said vessel comprises a sealed housing incorporating an object holder means upon which the object is placed, said metal rod being thermally and electrically coupled to said object holder means, and means effecting electrical connections to said rod whereby electrical power may be transmitted through said rod to the object upon said object holder means within said vessel.

5. A heat flow calorimeter as defined in claim 4, wherein said object holder means and said heat conducting rod are constructed in two electrically isolated sections, respective sections of said object holder means and said rod being connected together through a sectioned split heat flow concentrator, insulating material being disposed between all sections.

6. A heat flow calorimeter as defined in claim 5, wherein said object holder means comprises a tray member and underlying electrodes separated from said tray member by a sheet of insulating material, each electrode being respectively coupled to a separate electrically isolated section of said heat conducting rod, each electrode having an upturned tab to which electrical connection can be made to the object.

7. A heat flow calorimeter as defined in claim 1, wherein said thermal conductor means comprises a metal rod, said rod being coupled between the interior of said vessel and said heat sink.

8. A heat flow calorimeter as defined in claim 7, wherein said heater means comprises an electrical heater disposed within said vessel, and wherein said means for measuring the amount of heat supplied said vessel measures the electrical power supplied said heater.

9. A heat flow calorimeter as defined in claim 8, wherein said means for controlling said heater comprises a thermistor disposed within said vessel, which thermistor defines one arm of a bridge balancing circuit.

10. A heat flow calorimeter as defined in claim 9, wherein said means to maintain said shield at a substantially constant temperature includes a plurality of heater means connected to respective surface portions of said adiabatic shield, thermocouple circuit means connected to said heater means and coupled between said vessel and various respective surface portions of said adiabatic shield to maintain a zero temperature differential therebetween.

* * * * *